United States Patent
Oh et al.

(10) Patent No.: US 9,794,551 B1
(45) Date of Patent: Oct. 17, 2017

(54) LIGHT UNIFORMITY TESTING

(71) Applicant: Amazon Technologies, Inc., Reno, NV (US)

(72) Inventors: Hyuk-Joon Oh, Cupertino, CA (US); Eddie Alex Azuma, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 14/485,547

(22) Filed: Sep. 12, 2014

(51) Int. Cl.
| | |
|---|---|
| *G01N 21/00* | (2006.01) |
| *G01J 1/00* | (2006.01) |
| *H04N 7/18* | (2006.01) |
| *H04N 9/47* | (2006.01) |
| *H04N 17/00* | (2006.01) |

(52) U.S. Cl.
CPC ................. *H04N 17/002* (2013.01)

(58) Field of Classification Search
CPC .................................... H04N 17/002
USPC ............................................. 348/93
See application file for complete search history.

(56) References Cited

U.S. PATENT DOCUMENTS

| | | | | |
|---|---|---|---|---|
| 4,450,507 A | * | 5/1984 | Gordin ............... | B60Q 1/24 362/249.01 |
| 4,799,791 A | * | 1/1989 | Echizen ............ | G03F 7/70133 356/121 |
| 6,075,238 A | * | 6/2000 | Fembok ............. | G01V 8/22 250/221 |
| 6,077,636 A | * | 6/2000 | Moriki .............. | G03G 9/0806 399/252 |
| 9,071,744 B1 | * | 6/2015 | Rahman ............ | H04N 17/002 |
| 2004/0246473 A1 | * | 12/2004 | Hermary ........... | G01B 11/245 356/237.1 |
| 2005/0041286 A1 | * | 2/2005 | White ............... | G02B 3/0056 359/452 |
| 2013/0188382 A1 | * | 7/2013 | Nieminen .......... | G03B 21/208 362/551 |

OTHER PUBLICATIONS

Wolfgang Dahn et al., Practical LED Light Measurement, LED Professional Review, Nov./Dec. 2009, pp. 2-4, Issue 16, Luger Research & LED-professional, World Wide Web, http://www.giga-hertz-optik.de/files/lpr__16__gigahertz__online.pdf.

* cited by examiner

*Primary Examiner* — Hee-Yong Kim
(74) *Attorney, Agent, or Firm* — Lowenstein Sandler LLP

(57) ABSTRACT

Systems and methods for testing a light emitting device are described. A processing device receives a receiving an image of a beam of light substantially free of parallax distortion and determines one or more uniformity metrics of the beam of light based on the received image.

18 Claims, 9 Drawing Sheets

LIGHT UNIFORMITY TESTING

BACKGROUND

An electronic device, such as a cellular phone, tablet or an electronic book reader, may include a number of devices to perform different functions. An electronic device may include, for example, a screen for consumption of digital media, such as movies, pictures or electronic books, or a microphone and speaker for participation in a phone call. An electronic device may also include a camera or other image capturing device to allow the user to take and store pictures. Such a camera may include a light emitting device or flash to illuminate the target of the picture.

A light emitting device of such a camera may be used to illuminate the target of the picture uniformly. The uniformity of the light emitting device may be tested during manufacture, prior to installation in the electronic device, and after the electronic device is fully assembled to ensure that the light emitting device emits a uniform field of light.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

An electronic device, such as a cellular phone, tablet or an electronic book reader, may include a camera or other image capturing device to allow the user to take and store pictures. Such a camera may include a light emitting device or flash to illuminate the target of the picture.

A light emitting device of such a camera may be used to illuminate the target of the picture uniformly. The uniformity of the light emitting device may be tested during manufacture, prior to installation in the electronic device, and after the electronic device is fully assembled to ensure that the light emitting device emits a uniform field of light.

If, prior to installation in an electronic device, a light emitting device is determined to produce a non-uniform beam of light to illuminate a target, the light emitting device may be discarded and not installed into an electronic device. If, after installation in an electronic device, a light emitting device is determined to produce a non-uniform beam of light to illuminate a target, a number of actions may be taken. For example, a different light emitting device may be installed into the electronic device. As another example, calibration parameters may be provided to the electronic device to compensate for the non-uniformity. In particular, the light emitting device or an image capturing device of the electronic device may be calibrated to produce images having uniform illumination of a target. Thus, it can be ensured that images taken by a consumer of the electronic device are uniformly illuminated.

Figure 1:
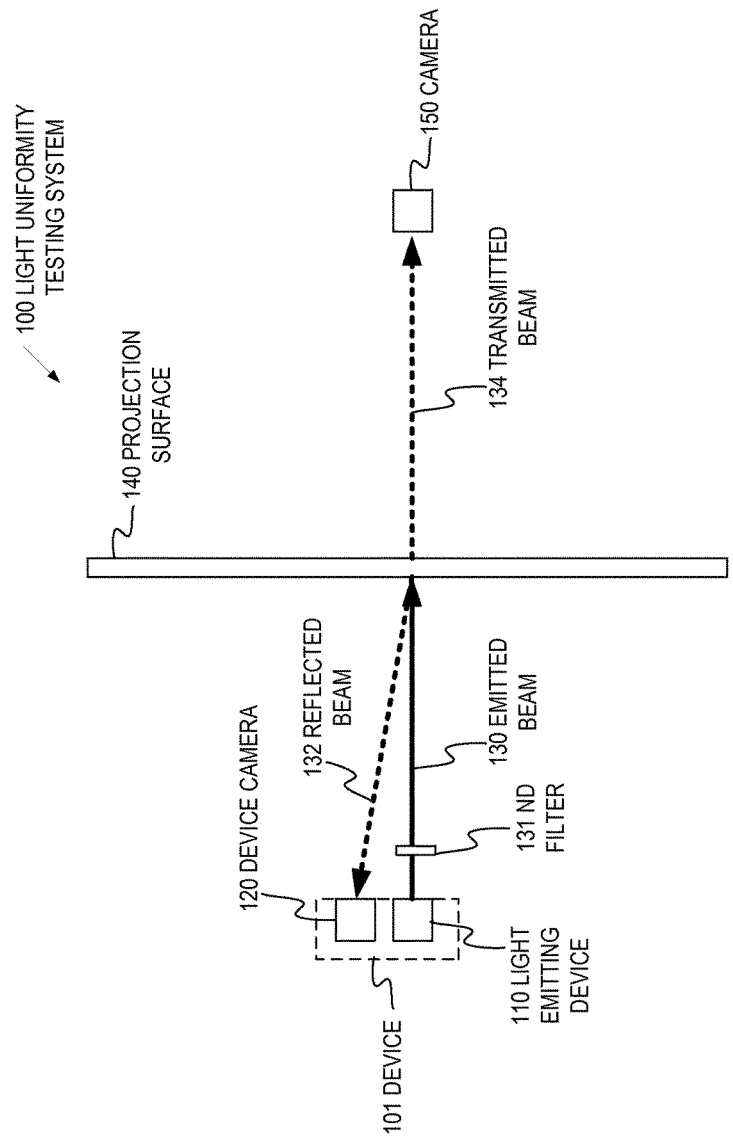
FIG. 1 illustrates an embodiment of a light uniformity testing system.

FIG. 1 illustrates an embodiment of a light uniformity testing system 100. The light uniformity testing system 100 includes a light emitting device 110 to be tested. The light emitting device 110 may be a light emitting diode (LED), an incandescent light, a compact florescent lamp (CFL), or any other light producing element. In one embodiment, the light emitting device 110 may be tested as a standalone unit, prior to installation into a device 101. In another embodiment, the light emitting device 110 may be tested as part of an assembled device 101. The device 101 may include the light emitting device 110 which emits light and a device camera 120 that measures light. The device camera 120 may measure light by capturing an image of a field of view. The device 101 may include additional components. The device 101 may be, for example, a cellular phone, a digital camera, a tablet, or any consumer electronic device.

The light emitting device 110 may be activated to generate an emitted beam 130 toward a projection surface 140. Although the emitted beam 130 is illustrated in FIG. 1 as an arrow for ease of illustration, it is to be appreciated that the emitted beam 130 has a height and width and illuminates a two-dimensional area of the projection surface 140.

The emitted beam 130 may be passed through a neutral density (ND) filter 131 prior to reaching the projection surface 140. In particular, the emitted beam 130 may propagate along a projection axis and the ND filter 131 may be disposed along the projection axis. The ND filter 131 may reduce the intensity of all wavelengths of light equally, resulting in no change to the color of the emitted beam 130 passing through the ND filter 131. Thus, the ND filter 131 uniformly reduces the intensity of all colors of the beam of light. In other embodiments, other filters may be used that selectively reduce the intensity of wavelengths of light passing through the filter. The ND filter 131 may reduce the brightness of the emitted beam 130 without changing the color properties or uniformity of the emitted beam 130.

In one embodiment, the projection surface 140 is a smooth surface of a uniform grayscale. For example, the projection surface 140 may be a wall painted gray. When the emitted beam 130 strikes the projection surface 140, a reflected beam 132 may be generated in the direction of the device camera 120. The device camera 120 may capture an image of the projection of the beam on the projection surface 140. The captured image may be analyzed, e.g., by the analysis system 200 of FIG. 2, to determine the uniformity of the emitted beam 130.

In another embodiment, the projection surface 140 is partially transparent. For example, the projection surface 140 may be a semi-transparent screen or sheet. When the emitted beam 130 strikes the projection surface 140, a transmitted beam 134 may be generated in the direction of the camera 150. The camera 150 may be disposed on an opposite side of the projection surface 140 as the light emitting device 110 so as to capture an image of the projection of the beam on the projection surface 140. The captured image may be analyzed, e.g., by the analysis system 200 of FIG. 2, to determine the uniformity of the emitted beam 130.

The light emitting device 110 and camera 150 may be positioned such that the emitted beam 130 and transmitted beam 134 are collinear. In one embodiment, the light emitting device 110, the center of the area of the projection surface 140 illuminated by the emitted beam 130, and the camera 150 are collinear. Thus, the transmitted beam 134 has the same shape and uniformity of the emitted beam 130 without distortion introduced by parallax shift as illustrated and described further below.

It is to be appreciated that the light uniformity testing system 100 may not include all of the components described above. For example, a system for testing the light emitting device 110 prior to installation in a device 101 may not include a device camera 120. As another example, a system for testing the light emitting device 110 in an assembled device 101 may not include the camera 150 disposed on the opposite side of the projection surface 140 as the light emitting device 110.

Figure 2:
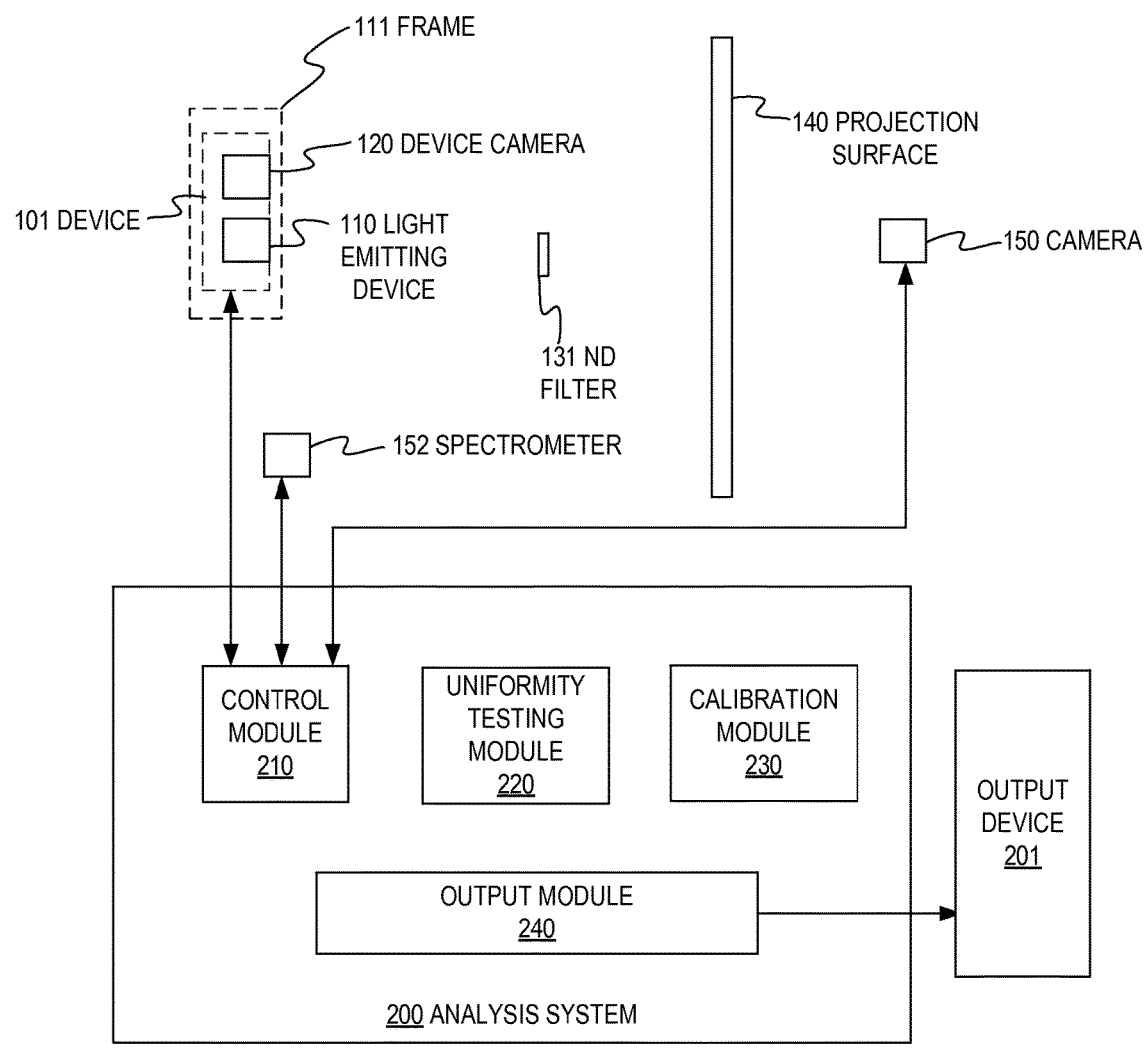
FIG. 2 illustrates an embodiment of an analysis system.

FIG. 2 illustrates an embodiment of an analysis system 200. The analysis system 200 may be embodied as computer system (e.g., the computer system 500 of FIG. 5) and may include one or more processing devices and or memory devices that may include encoded instructions for performing the functions of the modules described below.

The analysis system 200 includes a control module 210 to control the light emitting device 110 being tested and one or more data generating devices. The light emitting device 110 being tested may be inserted into a frame 111 that holds the light emitting device 110 in an orientation such that a transmitted beam is directed at a particular location of the projection surface 140. The control module 210 may, for example, turn the light emitting device 110 on or off to generate an emitted beam or cease generation of an emitted beam. The control module 210 may control the device camera 120 or the camera 150 to capture an image of a projection of the beam of light on the projection surface 140. The captured image may be image data comprising a matrix of pixels. In one embodiment, the captured image is a grayscale image and each of the pixels represents the intensity of light at a location of a projection surface as illuminated by the light emitting device 110. In another embodiment, the captured image is a color image and each pixel is associated with a color triplet representing the relative intensity of red, green, or blue light at a location of the projection surface 140 as illuminated by the light emitting device 110. The captured image may be stored for processing at any time. The control module 210 may control a spectrometer 152 to receive color data regarding a beam of light emitted by the light emitting device 110 indicative of the relative intensity of the beam of light across a range of frequencies. The spectrometer 152, as described further below, may receive the beam of light directly (without reflecting off the projection surface 140).

The analysis system includes a uniformity testing module 220 to analyze the captured image and determine one or more metrics of the uniformity of the emitted beam generated by the light emitting device 110 as described below.

The uniformity testing module 220 may generate an intensity metric indicative of an intensity or brightness of the light emitting device 110. The intensity metric may be, for example, the maximum intensity value of the pixels of a grayscale image. For a color image, an intensity value for each pixel may be determined as the average of the relative intensity of the red, green, and blue components and the intensity metric may be the maximum of this determined intensity value. The intensity metric may be expressed as a number indicative of the intensity of the light emitting device 110. The intensity metric may be expressed as a Boolean value indicative of the intensity of light falling within a predefined range or as otherwise passing or failing an intensity test. The intensity metric may be expressed in other ways.

The uniformity testing module 220 may generate a centering metric indicative of the location of the center of the emitted beam of the light emitting device. The centering metric may be, for example, the location of the maximum intensity value of the pixels. The centering metric may be, as another example, the location of the weighted average of the intensity of the pixels. In another embodiment, rather than a location, the centering metric may be a distance, such as the distance between the center of the emitted beam and a center of the image. The centering metric may be expressed as a location indicative of the center of the emitted beam, a number indicative of the distance between the center of the emitted beam and the center of the image, as a Boolean value indicative of whether the emitted beam is or is not appropriately centered, or in any other way. For example, the centering metric may be indicative of whether the center of the emitted beam is aligned with the center of the imaging field of the device camera 120.

The uniformity testing module 220 may generate a color metric indicative of a color of the emitted beam of light. The color metric may be, for example, a hue value indicative of an average of the hue values of a captured color image. The color metric may be, as another example, a ratio of a first color to a second color. For example, if the light emitting device 110 includes two LEDs of two different colors, the color metric may indicate the relative intensities of these two colors.

The uniformity testing module 220 may generate a roll-off metric indicative of the difference in intensity between the center of the emitted beam and portions of the emitted beam distanced from the center. The roll-off metric may be determined, for example, as the ratio between the intensity of the center of the image and the average (or maximum or minimum) of the intensity of the one or more of the four corners of the image. The roll-off metric may be determined, as another example, of the average (or maximum or minimum) distance between the center of the image and pixels having an intensity of a fraction (e.g., half) of the intensity of the center.

The uniformity testing module 220 may generate a symmetry metric indicative of symmetry of the shape of the emitted beam. The symmetry metric may be, for example, a difference in intensity between a pixel on a right side of the image and a corresponding pixel on the left side of the image. The symmetry metric may be a circularity metric, e.g., a measure of the circularity of pixels having an equal intensity (or an intensity within a range). For example, contour lines may be calculated based on the image and the symmetry metric may be a measure of circularity of the contour lines.

The uniformity testing module 220 may generate other metrics. The metrics may be expressed as numbers, locations, or in any other form. For example, the uniformity testing module 220 may generate one or more metrics expressed as Boolean values indicative of whether the light emitting device 110 is or is not defective. The uniformity testing module 220 may include image processing software, such as Imatest Master produced by Imatest, LLC of Boulder, Colo., for performing image quality testing and generating uniformity metrics.

The analysis system 200 may include a calibration module 230 to generate a calibration for a device 101 based on the metrics generated by the uniformity testing module 220. The control module 210 may calibrate the device 101 using the calibration. The calibration module 230 may generate the calibration for a device 110 to compensate for any non-uniformity of the light emitting device 110. The calibration may instruct the device 101 to digitally filter images captured by the device camera 120 to compensate for variation of the light emitting device 110. The filter may include a neutral density filter, a color filter, or a spatial filter. For example, if an intensity metric for the light emitting device 110 indicates that the light emitting device 110 is weaker than expected or desired, the calibration may increase a gain of the device camera 120. As another example, if a color metric for the light emitting device 110 indicates that the light emitting device 110 is more blue than expected or desired, the calibration may instruct the device camera 120 to digitally filter captured images to reduce the blue component before storing the captured image.

The analysis system 200 may include an output module 240 for providing an output based on the metrics generated by the uniformity testing module 220. For example, as noted above, the uniformity testing module 220 may generate one or more metrics expressed as Boolean values indicative of whether the light emitting device 110 is or is not defective. The output module 240 may output an indication of whether the light emitting device 110 is or is not defective or is or is not suitable for installation in an electronic device. The output produced by the output module 240 may sent to an output device 201, such as a screen for display or a memory for storage.

Figure 3:
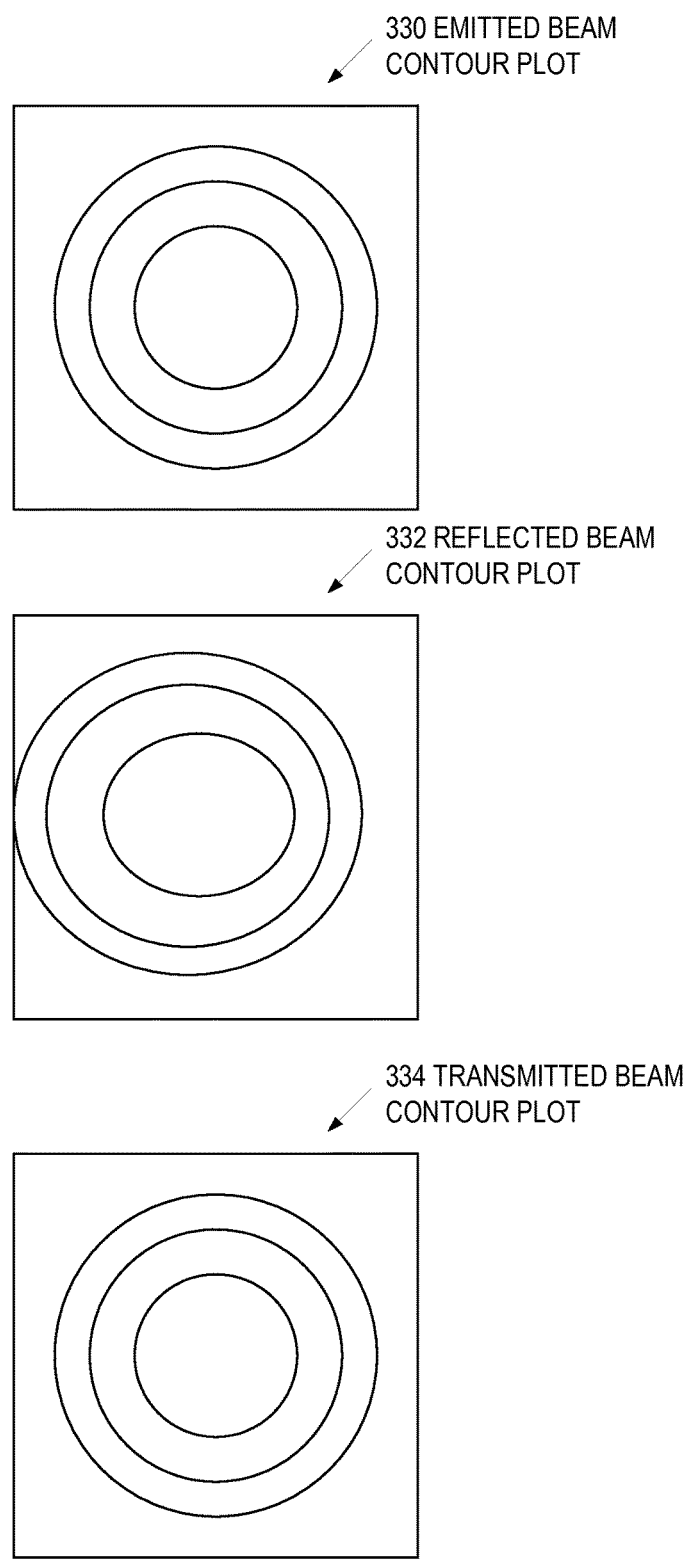
FIG. 3 illustrates embodiments of contour plots of the beams of FIG. 1.

FIG. 3 illustrates embodiments of contour plots of the beams of FIG. 1. The emitted beam contour plot 330 illustrates a perfectly symmetrical emitted beam with a spatially uniform roll-off. The reflected beam contour plot 332 illustrates an example result of a captured image by the device camera 120 of FIG. 1. As shown in FIG. 3, despite the uniformity of the emitted beam, the resulting reflected beam contour plot 332 shows an asymmetric beam. This distortion may be introduced by the parallax disparity between the emitted beam and the reflected beam. Because the reflected beam is at an angle to the emitted beam due to the different positions of the light emitting device 110 and the device camera 120, the reflected beam contour plot 332 may be distorted.

Additional processing may be performed on the image captured by the device camera 120 to compensate for the parallax distortion prior to generating uniformity metrics. However, some information regarding to the uniformity of the emitted beam may be unrecoverable by such processing.

Thus, in one embodiment, as described above, the emitted beam is directed at a partially transparent projection surface and a camera on an opposite side of the projection surface is used to capture an image of the transmitted beam. The transmitted beam contour plot 334 illustrates an example result of a captured image by such a camera (e.g., camera 150 of FIG. 1). Because the emitted beam and the transmitted beam are collinear, parallax distortion may be reduced or eliminated. Thus, the transmitted beam contour plot 334 accurate reflects the reflected beam contour plot 330.

Figure 4:
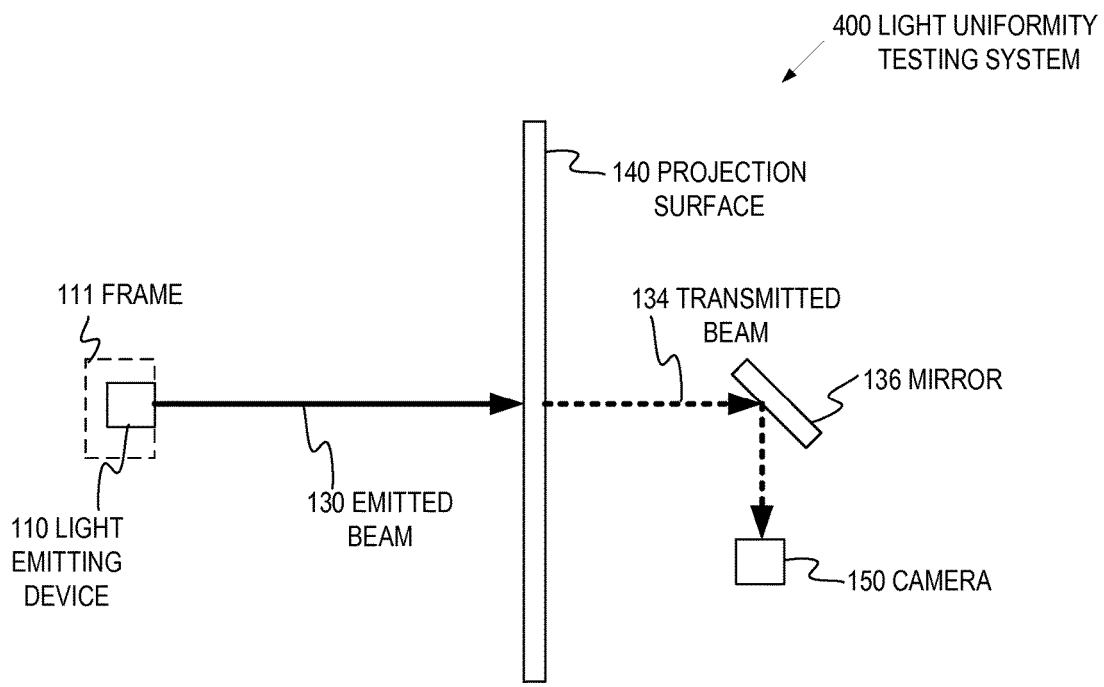
FIG. 4 illustrates an embodiment of light uniformity testing system including a mirror.

FIG. 4 illustrates an embodiment of light uniformity testing system 400 including a mirror 136. As noted above, parallax distortion of the emitted beam may be reduced or eliminated by disposing the camera on an opposite side of a partially transparent projection surface as the light emitting device such that the emitted beam and transmitted beam are collinear. FIG. 4 illustrates another configuration to reduce or eliminate parallax distortion of the emitted beam.

In FIG. 4, the light emitting device 110 generates an emitted beam 130 that propagates towards a partially transparent projection surface 140. The transmitted beam 134 is redirected by a mirror 136 prior reaching the camera 150 disposed on the opposite side of the projection surface 140.

The light emitting device 110 may be inserted into a frame 111 that holds the light emitting device 110 in an orientation such that the transmitted beam 134 is directed at a particular location of the projection surface 140. Although not illustrated in the embodiment of FIG. 1, it is to be appreciated that such a frame 111 may be used in the light uniformity system 100 of FIG. 1 to hold the light emitting device 110 alone or the device 101 including the light emitting device 110.

In some cases, the light uniformity testing system 400 may be used instead of the light uniformity testing system 100 of FIG. 1 as the amount of space taken up by the system 400 may be less than that of the system 100. In particular, the distance between the light emitting device 110 and the mirror 136 in FIG. 4 may be less than the distance between the light emitting device 110 and the camera 150 in FIG. 1.

In some cases, the light uniformity testing system 100 of FIG. 1 may be used instead of the light uniformity testing system 400 of FIG. 4 as misalignment of the mirror 136 in FIG. 4 may introduce distortion of the transmitted beam 134.

Figure 5:
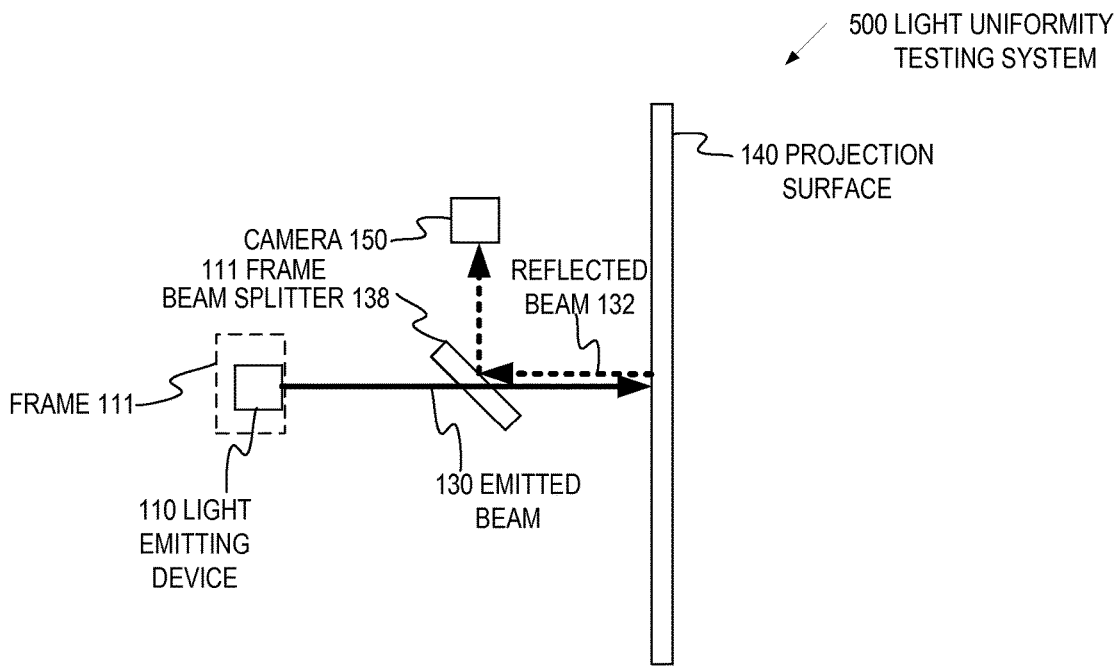
FIG. 5 illustrates an embodiment of a light uniformity testing system including a beam splitter.

FIG. 5 illustrates an embodiment of a light uniformity testing system 500 including a beam splitter 138. FIG. 5 illustrates another configuration to reduce or eliminate parallax distortion of the emitted beam.

In FIG. 5, the light emitting device 110 generates an emitted beam 130 that propagates towards a reflective projection surface 140 and through a beam splitter 138 before reaching the projection surface 140. The beam splitter 138 passes light travelling in a first direction, but redirects light travelling in the opposite direction. Thus, the beam splitter 138 may transmit the emitted beam 130 from the light emitting device 110 to the projection surface 140, but redirect the reflected beam 132 from the projection surface 140 to the camera 150.

Although the reflected beam 132 in FIG. 5 is shown displaced from the emitted beam 130 for ease of illustration, it is to be appreciated that the reflected beam 132 travels the same path (but in the opposite direction) as the emitted beam 130 between the beam splitter 138 and the projection surface 140.

In some cases, the light uniformity testing system 500 may be used instead of the light uniformity testing system 100 of FIG. 1 as the amount of space taken up by the system 400 may be less than that of the system 100. In some cases, the light uniformity testing system 100 of FIG. 1 may be used instead of the light uniformity testing system 500 of FIG. 5 as that misalignment of the beam splitter 138 in FIG. 5 may introduce distortion of emitted beam 130 or the reflected beam 132.

FIGS. 4 and 5 illustrate embodiments of light uniformity testing system including redirection optics (e.g., a mirror 136 or a beam splitter 138) that redirects the beam of light towards the camera 150. Other embodiments may include other types of redirection optics, including lens, prism, and other optical elements.

Figure 6:
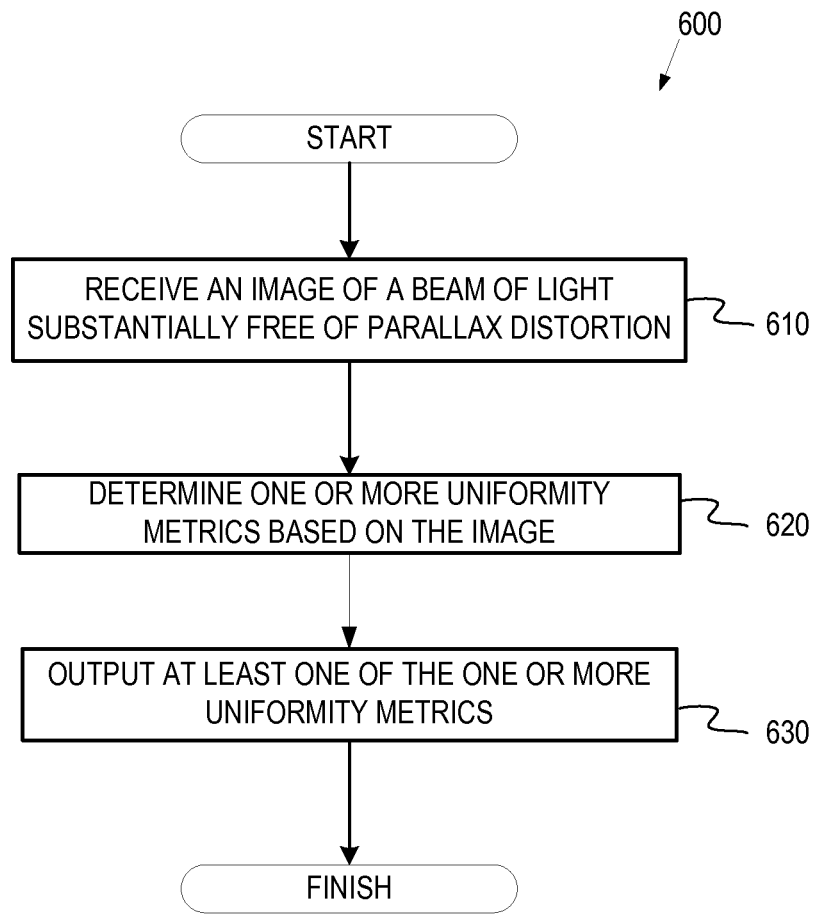
FIG. 6 illustrates a flowchart of an embodiment of a method for testing a light emitting device.

FIG. 6 illustrates a flowchart of an embodiment of a method for testing a light emitting device. The method 600 may be performed by processing logic that may include hardware (e.g., circuitry, dedicated logic, programmable logic, microcode, etc.), software (e.g., instructions executed by a processing device), firmware or a combination thereof. For example, the method 600 may be performed by the analysis system 200 of FIG. 2 (or a processing device thereof). The method 600 may additionally be performed by a light uniformity testing system, such as the light uniformity testing system 100 of FIG. 1. It is to be appreciated that the method 600 may be performed for any number of light emitting devices consecutively or concurrently. However, for ease of reference, the method 600 is described for a single light emitting device in FIG. 6.

At block 610, the processing logic receives image data of an image of a projection, on a projection surface, of a beam of light substantially free of parallax distortion. The image data may be received from an image capture device, such as the camera 150 of FIG. 1. The image data may be received from an image capture device that is aligned with the light emitting device such that the light emitting device emits light along a projection axis toward a projection surface and the image capture device is disposed along the projection axis. For example, the light emitting device may be disposed on a first side of semi-transparent projection surface and the image capture device may be disposed on a second, opposite side of the projection surface.

The image data may be received from an image capture device that captures an image of a mirror or beam splitter that redirects the beam of light reflected from or transmitted through a projection surface without introducing parallax distortion. For example, the beam of light may be redirected at a substantially right angle.

The image of the projection of the beam of light may be substantially free of parallax distortion if the propagation path traveled by the beam of light includes no angles greater than one degree and no angles more than one degree from a right angle. Thus, the image of the projection of the beam of light may be substantially free of parallax distortion if the propagation path only includes angles less than one degree or between 89 and 91 degrees. In other embodiments, the image of the projection of the beam of light may be substantially free of parallax distortion if the propagation path only includes angles of less than three degrees or between 87 and 93 degrees.

The image of the projection of the beam of light may be substantially free of parallax distortion if no processing of the image is performed to remove parallax distortion from the image in determining the uniformity metrics (as described below with respect to block 620). Thus, in one embodiment, the method 600 includes receiving image data and processing the image data to determine one or more uniformity metrics without processing the image data to reduce parallax distortion. In particular, receiving the image data may include receiving image data of a raw image from the image capturing device without processing to compensate for (e.g., reduce or remove) parallax distortion.

At block 620, the processing logic determines one or more uniformity metrics based on the image. The uniformity metrics may include any of the uniformity metrics described above and may include other uniformity metrics. In one embodiment, the processing logic determines whether the light emitting device meets a production standard. For example, the processing logic may determine a uniformity metric and compare the metric to a threshold. If the uniformity metric is above (or below) the threshold, the processing logic may determine that the light emitting device does (or does not) meet the production standard.

In one embodiment, the processing logic determines an intensity metric such as a maximum intensity of the beam of light. The processing logic may determine that the light emitting device does not meet a production standard if the maximum intensity of the beam of light is below a first threshold (e.g., the light emitting device is too weak) or is above a second threshold (e.g., the light emitting device is too strong).

In one embodiment, the processing logic determines a centering metric such as the location of the center of the beam of light. The location of the center of the beam of light may be determined as the location of the average intensity or the location of the maximum intensity. The location of center of the beam of light may be determined in other ways. The processing logic may determine that the light emitting device does not meet a production standard if a distance between the location of the center of the beam of light and an expected location is more than a threshold (e.g., the light emitting device is misaligned).

In one embodiment, the processing logic determines a color metric, such as an average color of the beam of light. The processing logic may determine that the light emitting device does not meet a production standard if the color is more than a threshold amount different from an expected color (e.g., white or gray).

In one embodiment, the processing logic determines a roll-off metric, such as a roll-off of the beam of light at a particular distance. The processing logic may determine the roll-off based on a ratio of the intensity at the location of the center of the beam of light to an intensity at a location spaced apart (e.g., the particular distance away) from the location of the center of the beam of light. The roll-off may be the inverse of this ratio. The processing logic may determine that the light emitting device does not meet a production standard if the roll-off is greater than or less than a threshold (e.g., the light emitting device has too wide or too narrow a beam).

In one embodiment, the processing logic determines a symmetry metric. The symmetry metric may be based on an intensity of a location on one side of the beam and an intensity of a mirrored location on the opposite side of the beam. The processing logic may determine that the light emitting device does not meet a production standard if the two intensities are more than a threshold amount different. In one embodiment, the symmetry metric may be based on one or more contour lines from which a circularity metric is determined.

At block 630, the processing logic outputs at least one of the uniformity metrics. The processing logic may output the uniformity metric(s) via a user interface, such as a screen. In one embodiment, the processing logic outputs whether or not the light emitting device meets a production standard. If the processing logic determines that the light emitting device does not meet the production standard, the output may include a reason. For example, the processing logic may indicate that the light emitting device does not meet the production standard because a maximum intensity of the beam of light is too low. The processing logic may output any of the uniformity metrics.

Figure 7A:
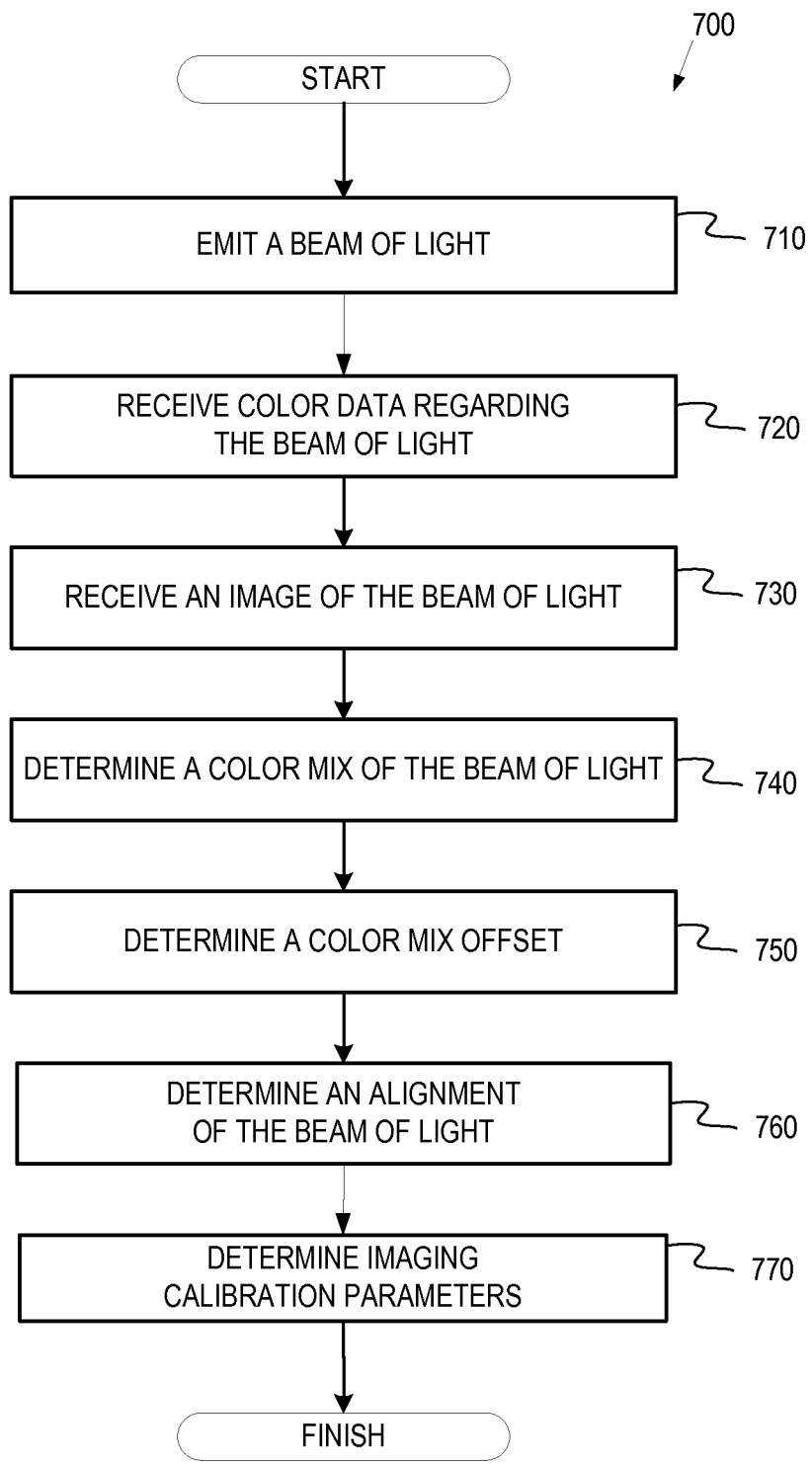
FIG. 7A illustrates a flowchart of an embodiment of another method for testing a light emitting device.

FIG. 7A illustrates a flowchart of an embodiment of another method for testing a light emitting device. The method 700 may be performed by processing logic that may include hardware (e.g., circuitry, dedicated logic, programmable logic, microcode, etc.), software (e.g., instructions executed by a processing device), firmware or a combination thereof. For example, the method 700 may be performed by the analysis system 200 of FIG. 2 (or a processing device thereof). The method 700 may additionally be performed by a light uniformity testing system, such as the light uniformity testing system 100 of FIG. 1. It is to be appreciated that the method 700 may be performed for any number of light emitting devices consecutively or concurrently. However, for ease of reference, the method 700 is described for a single light emitting device in FIG. 7A.

The method 700 begins, at block 710, with the processing logic emitting a beam of light from a light emitting device. The processing logic may activate the light emitting device to cause the light emitting device to emit the beam of light. The beam of light may be emitted towards a spectrometer or an image capturing device.

Figure 8:
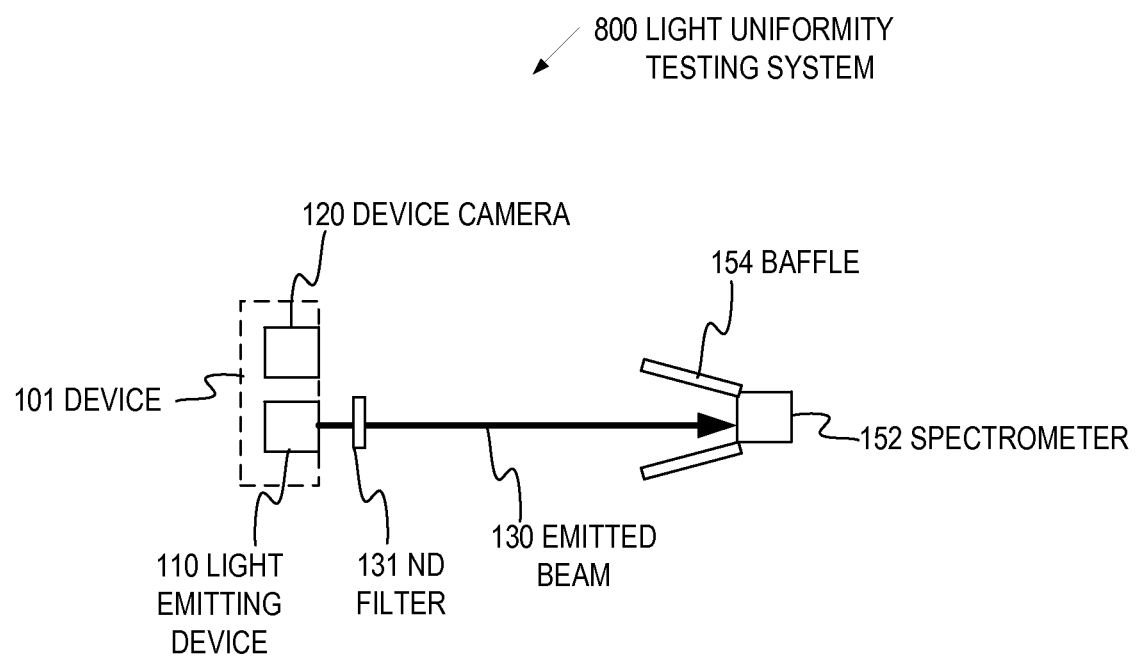
FIG. 8 illustrates an embodiment of light uniformity testing system including a spectrometer.

FIG. 8 illustrates an embodiment of light uniformity testing system 800 including a spectrometer 152. In FIG. 8, the light emitting device 110 generates an emitted beam 130 that propagates towards a spectrometer 152. The light uniformity testing system 800 may include one or more light baffles 154 to reduce glare and prevent light other than the emitted beam 130 from being read by the spectrometer 152. The spectrometer may produce color data regarding the emitted beam 130 indicative of the relative intensity of the beam of light across a range of frequencies.

When a beam of light is emitted towards a spectrometer, the spectrometer may generate color data regarding the beam of light. When emitted towards a projection surface, a reflected beam of light and/or a transmitted beam of light may be generated towards an image capturing device which captures an image of the beam of light as reflected from or transmitted through the projection surface.

Returning to FIG. 7A, at block 720, the processing logic receives color data regarding the beam of light. The color data may be generated by a spectrometer. The color data may indicate the relative intensity of the beam of light at a range of frequencies. In another embodiment, the color data may be generated by analysis of an image captured by the image capturing device.

At block 730, the processing logic receives image data of an image of a projection, on a projection surface, of the beam of the light. The image data may be received, for example, from an image capturing device.

At block 740, the processing logic determines a color mix of the beam of light. The color mix may indicate the relative intensity of two or more colors of the beam of light or the relative strength of two or more differently colored light producing elements of the light emitting device. For example, in one embodiment, the light emitting device may include two LEDs that produce light at a different range of frequencies. For example, the two LEDs may include a predominantly blue LED and a predominantly yellow LED. When both LEDs are activated at the appropriate strength, the beam of light may appear white, with an approximately uniform intensity of light over visible frequencies. The color mix may indicate the relative strength of each of the LEDs.

Ensuring that the beam of light appears white may require that the two LEDs be powered in the appropriate ratio. At block 750, the processing logic determines a color mix offset based on the color offset. The color mix offset may indicate an appropriate power to provide to each of the two (or more) LEDs of the light emitting device in order to produce a white light (e.g., a uniform spectrum of light over visible frequencies). For example, if the color mix indicates that the emitted beam has a first color at a strength of 0.6 and a second color at a strength of 0.4 when these values should be equal, the color mix offset may indicate that the element producing the first color should be powered less and the element producing the second color should be powered more. The color mix offset may be provided to the image capturing device (or an electronic device including the image capturing device) before the image (received in block 730) is captured.

At block 760, the processing logic determines an alignment of the beam of light. The alignment of the beam of light may be indicative of the location of a center of the beam of light. The alignment of the beam of light may be indicative of a distance of the location of the center of the beam of light to a center of the image. The alignment of the beam of light may be indicative of whether the center of the beam of light is aligned with a center of the image. The alignment may be used to determine whether the light emitting device meets a production standard.

At block 770, the processing logic determines one or more imaging calibration parameters based on the captured image. The calibration parameters may be provided to the image capturing device (or an electronic device including the image capturing device) to be applied to images taken by the image capturing device.

Figure 7B:
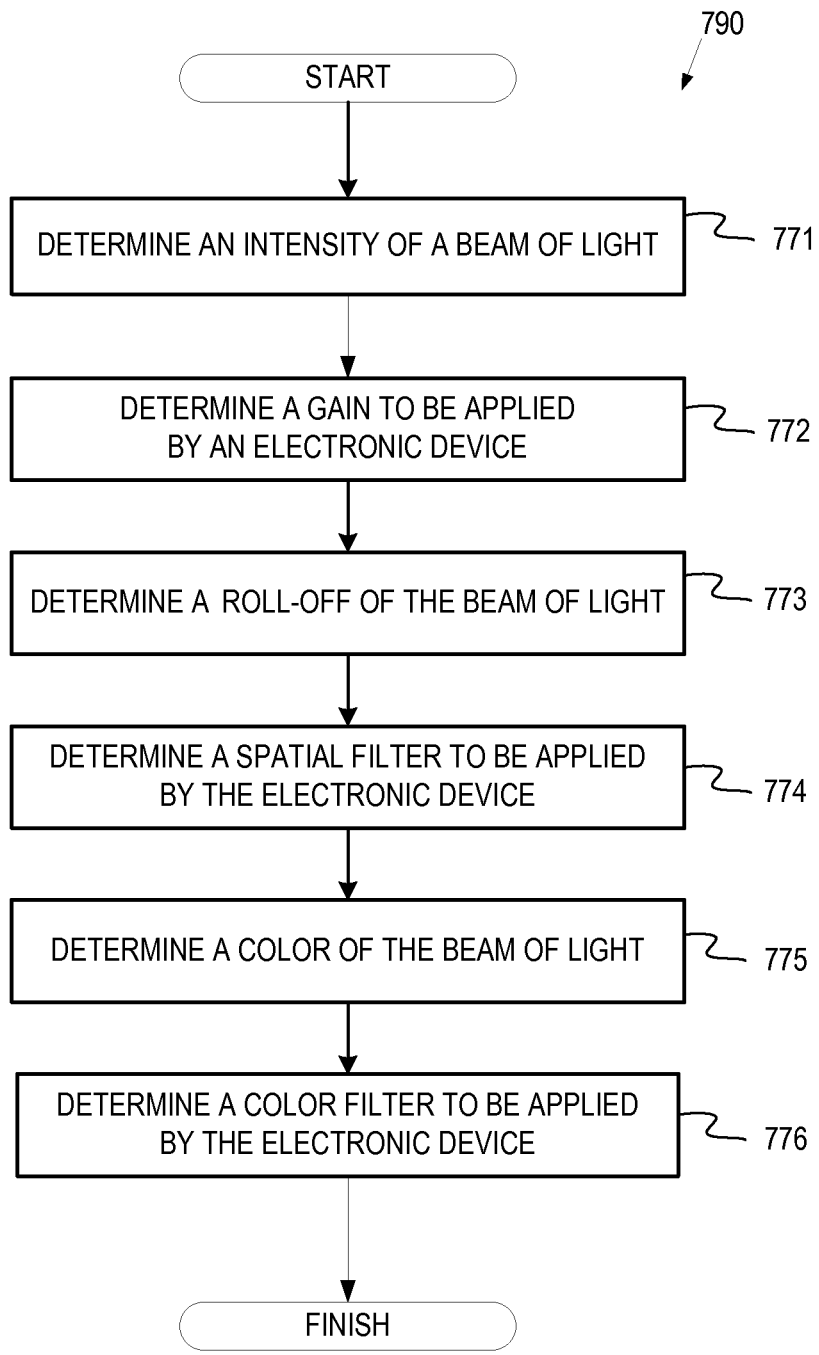
FIG. 7B illustrates a flowchart of an embodiment of a method for generating calibration parameters.

FIG. 7B illustrates a flowchart of an embodiment of a method for generating calibration parameters. The imaging calibration parameters may include at least one of a gain, a spatial intensity filter, or a color filter. In one embodiment, the received image is analyzed to determine an intensity of the beam of light (block 771). The intensity of the beam of light may be the maximum intensity of the captured image. The intensity of the beam of light may be the average intensity of an area around the center of the image. The intensity of the beam of light may be determined in other ways. Based on the intensity of the image, a gain may be determined (block 772). For example, if the intensity of the beam of light is lower than expected, a higher gain may be determined. The gain may be provided to the image capturing device such that images illuminated by the beam of light and taken with the image capturing device (after the gain is applied) have a uniform intensity picture-to-picture.

In one embodiment, a roll-off of the beam of light is determined (block 773). The roll-off of the beam of light may be determined in any manner described above. For example, the roll-off of the beam of light may be determined as a ratio between the intensity of the center of the image and the corners of the image. Based on the roll-off of the beam of light, a spatial intensity filter may be generated by the processing logic (block 774). The spatial filter may increase the intensity of the edges of the image or decrease the intensity of the center area of the image such that images illuminated by the beam of light and taken with the image capturing device (after the spatial filter is applied) have a uniform intensity across the picture.

In one embodiment, a color of the beam of light is determined (block 775). The color of the beam of light may be determined as the average color of the captured image or by any other method. Based on the color of the beam of light, a color filter may be generated by the processing logic (block 776). The color filter may increase or decrease the relative intensity of specific color components (e.g., red, green or blue components) such that images illuminated by the beam of light and taken with the image capturing device (after the color filter is applied) accurately reflect the true color of the target.

Figure 9:
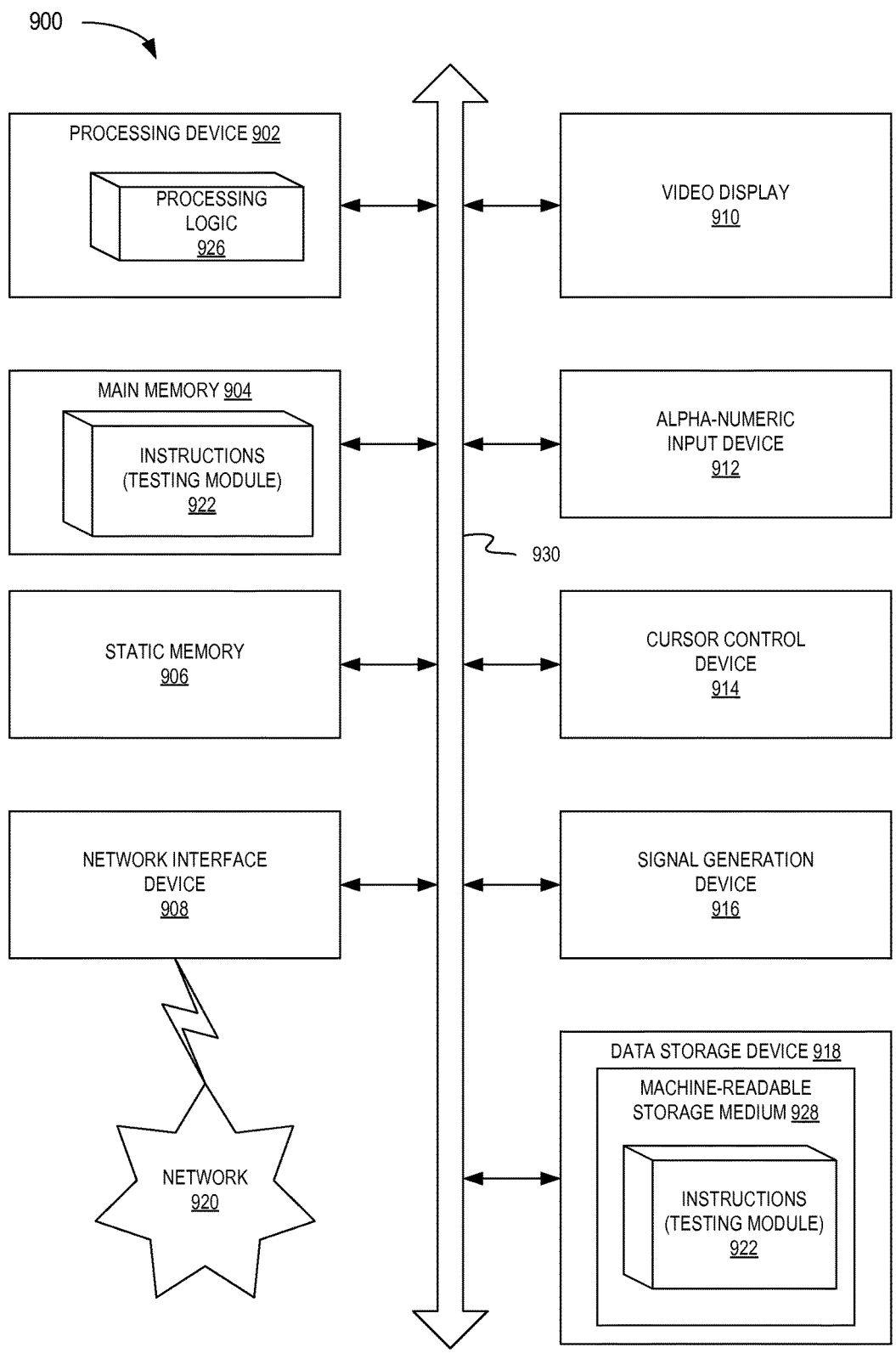
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. The computer system 900 may correspond to the analysis system 200 of FIG. 2. The computer system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

The processing device 902 represents one or more general-purpose processing devices such as a microprocessor, central processing unit or the like. More particularly, the processing device 902 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor or the like. The processing device 902 is configured to execute the processing logic 926 for performing the operations and steps discussed herein. For example, the processing logic 926 may include a testing module that performs the methodologies of FIG. 6, FIG. 7A and/or FIG. 7B.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker).

The data storage device 918 may include a computer-readable medium 928 on which is stored one or more sets of instructions 922 (e.g., instructions to perform the method 600 of FIG. 6, the method 700 of FIG. 7A, or the method 790 of FIG. 7B) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions 922 may further be transmitted or received over a network 920 via the network interface device 908.

While the computer-readable storage medium 928 is shown in an exemplary embodiment to be a single medium, the term "computer-readable storage medium" or "computer-readable medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a semi-transparent gray projection surface;
a light emitting device comprising one or more light emitting diodes (LEDs), disposed on a first side of the projection surface, to emit a beam of light along a projection axis normal to the projection surface;
an image capturing device, disposed on a second side of the projection surface opposite the first side, to capture an image of the projection surface that is substantially free of parallax distortion, wherein the image capturing device is disposed along the projection axis; and
a processing device operatively coupled to the image capturing device, the processing device to:
determine a roll-off value for the beam of light based on an intensity at a center of the image and an intensity at one or more corners of the image; and
determine whether the device passes a uniformity test based on the roll-off.

2. The system of claim 1, wherein to determine whether the device passes the uniformity test, the processing device is configured to compare the roll-off value to a threshold value.

3. The system of claim 1, wherein the processing device is further to determine a color of the beam of light based on the image and determine whether the device passes the uniformity test based on whether the color is more than a threshold amount different from an expected color.

4. The system of claim 1, wherein the processing device is further to determine a shape of the beam of light and determine whether the device passes the uniformity test based on whether the shape of the beam of light satisfies a circularity metric.

5. A method comprising:
receiving, by a processing device, an image of a projection of a beam of light transmitted through a projection surface, wherein the image of the projection of the beam of light is a raw image received from an image capturing device without processing to compensate for parallax distortion and wherein the image is substantially free of parallax distortion; and
determining, by the processing device, one or more uniformity metrics of the beam of light based on the received image.

6. The method of claim 5, wherein determining the one or more uniformity metrics comprises determining a maximum intensity of the beam of light based on a maximum intensity of the image.

7. The method of claim 6, wherein determining the one or more uniformity metrics comprises determining a location of a center of the beam of light based on the location of at least one of the maximum intensity of the image of the projection or an average intensity of at least a portion of the image of the projection.

8. The method of claim 5, wherein determining the one or more uniformity metrics comprises determining a color of the beam of light based on a color of the image of the projection.

9. The method of claim 5, wherein determining the one or more uniformity metrics comprises determining a roll-off value of the beam of light based on an intensity of the image at a center location and the intensity of the image of the projection at least one location spaced apart from the center location.

10. The method of claim 5, wherein determining the one or more uniformity metrics comprises determining a symmetry of the beam of light based on a difference in intensity between a pixel on a right side of the image and a corresponding pixel on a left side of the image.

11. The method of claim 5, wherein determining the one or more uniformity metrics comprises determining one or more contour lines and determining a circularity metric for at least one of the one or more contour lines.

12. The method of claim 5, wherein the beam of light is projected onto a first side of the projection surface and the image is of a second side of the projection surface opposite the first side.

13. The method of claim 5, wherein the beam of light is projected onto a first side of the projection surface and the image is of a mirror disposed on a second side of the projection surface opposite the first side.

14. A system comprising:
a projection surface;
an image capturing device to capture an image of a projection, on the projection surface, of a beam of light emitted by a light emitting device and transmitted through the projection surface, wherein the image is substantially free of parallax distortion and wherein the beam of light is along a projection axis substantially normal to the projection surface and the image capturing device is disposed along the projection axis; and
a processing device operatively coupled to the image capturing device, the processing device to determine one or more uniformity metrics of the beam of light based on the image.

15. The system of claim 14, wherein the image capturing device is disposed on a first side of the projection surface and the light emitting device is disposed on a second side of the projection surface, the second side being opposite to the first side.

16. The system of claim 15, further comprising a mirror disposed on the first side of the projection surface to redirect the beam of light towards the image capturing device.

17. The system of claim 14, wherein the processing device is to compare at least one of the one or more uniformity metrics to a threshold to determine whether the light emitting device meets a production standard.

18. The system of claim 14, wherein a uniformity metric of the one or more uniformity metrics is at least one of: an intensity of the beam of light, a center of the beam of light, a color of the beam of light, a roll-off value of the beam of light, or a shape of the beam of light.

\* \* \* \* \*